UNITED STATES PATENT OFFICE.

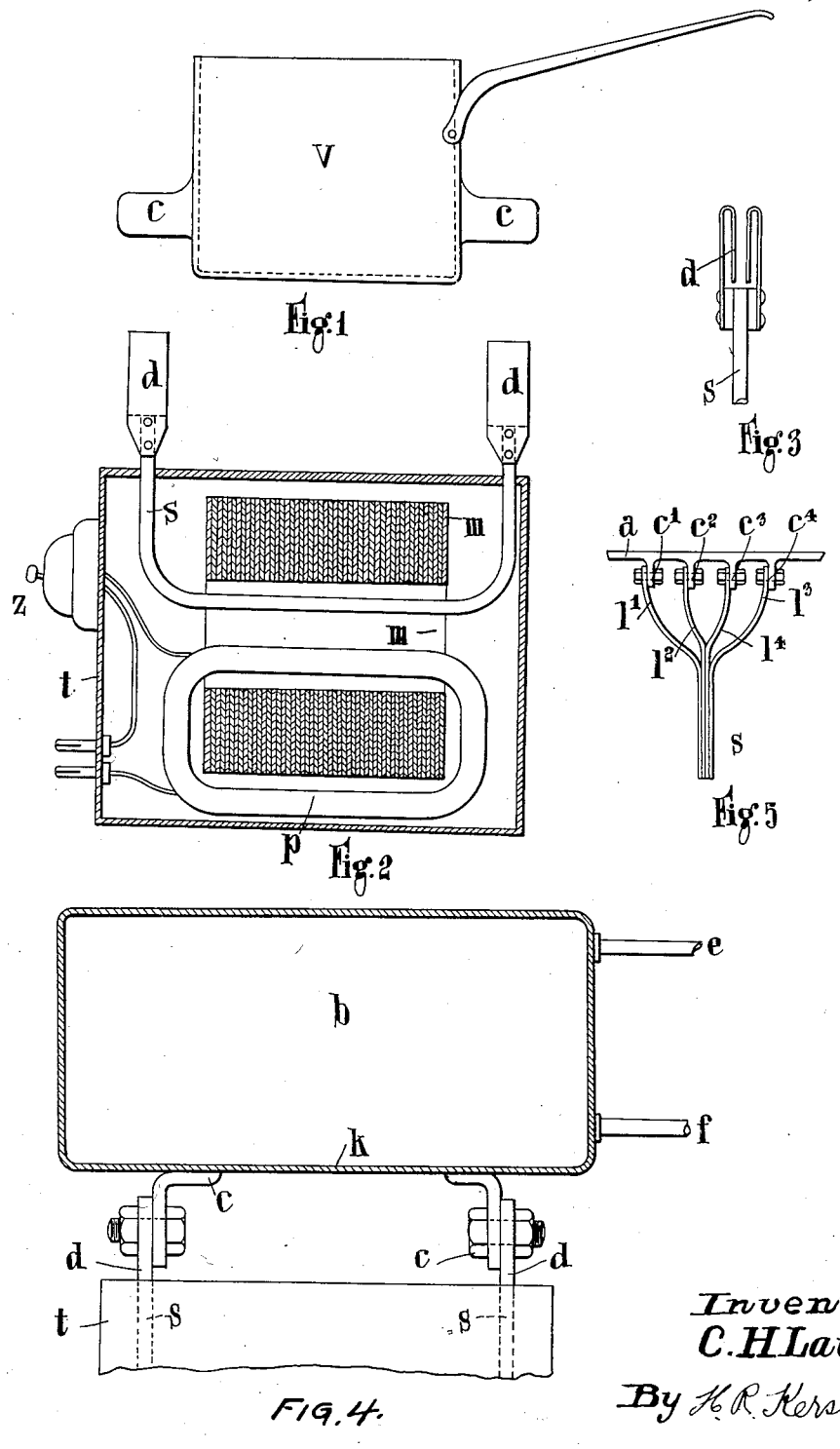

CLARENCE HAROLD LAUTH, OF LONDON, ENGLAND.

ELECTRIC COOKING OR HEATING VESSEL AND APPARATUS.

1,398,866.  Specification of Letters Patent.  Patented Nov. 29, 1921.

Application filed December 16, 1919. Serial No. 345,351.

*To all whom it may concern:*

Be it known that I, CLARENCE HAROLD LAUTH, a subject of the King of Great Britain and Ireland, and residing at 11 Highbury Mansions, London, N. 1, England, have invented certain new and useful Improvements in and Relating to Electric Cooking or Heating Vessels and Apparatus, of which the following is a specification.

This invention relates to improved electric cooking or heating vessels and apparatus of the type in which the heating current is of high amperage and low voltage and flows through the shell of the cooking or heating vessel intended to receive the substances to be cooked or heated, the said shell constituting the main resistance of the circuit wherein the heat necessary for heating or cooking purposes is developed, in contradistinction to cooking or heating vessels heated by means of separate electric resistances mounted within the vessel or in the shell thereof, as well as in contradistinction to electric grilles, sad irons and electric hot plates.

The invention is more particularly intended to be used in connection with the secondary circuit of a transformer, but I wish it to be understood that the invention is not limited to the use of the cooking or heating vessels, hereinafter more particularly referred to, in connection with transformers.

In heating or cooking apparatus of the type first hereinbefore referred to when used in conjunction with a transformer, one of the main difficulties which were encountered has been that the transformer had to be designed so as to conform to the shape and proportions of the vessel, its electrical proportions being inefficient in consequence thereof.

A further difficulty was that the resistance of the apparatus was very low, which necessitated an excessively large secondary current with consequent excessive magnetic reaction and magnetic leakage in the transformer.

Further, when the apparatus was so designed as to cause the current to pass directly from a secondary circuit into the shell of a removable vessel, the secondary and its terminals were necessarily made of large size and large thermal capacity relatively to the vessel, which, in conjunction with the vibrations in the vessel, and of the vessel on the secondary terminals, rendered such designs impracticable.

One of the main objects of the invention is to provide improved means for establishing the connection between the secondary circuit of the transformer and the shell of the heating or cooking vessel, another main object being to prevent overheating of the transformer owing to its too near proximity to the vessel. Further objects of the invention are to obviate the necessity of using transformers of inefficient design, to provide improved means for readily attaching the transformer to the heating vessel, or detaching it therefrom, and to secure a very much higher rate of heating loading per square inch of surface of the heating vessel than has hitherto been practicable.

According to the present invention, the shell of a vessel of the type referred to is provided with contacts secured thereto, the said contacts being in good thermal and electrical contact with the shell and engaging in a readily detachable way with the terminals of the electric circuit, viz., the secondary coil of the transformer when used in conjunction with the latter.

It is known in electric cooking apparatus, to connect the cooking vessel with the electric circuit in a readily detachable manner, more particularly by means of knife and spring contacts, but in such known construction, the contacts attached to the vessel are not in electric contact with the shell thereof but with a heating unit mounted within the base or other part of the vessel.

The invention also consists in the improved electric cooking or heating vessels and apparatus of the type referred to as hereinafter more particularly described.

In the accompanying drawings illustrating by way of example different modes of carrying the invention into effect, Figure 1 is an elevation of the improved cooking vessel, Fig. 2 is a sectional elevation of the transformer adapted to be used in conjunction with the vessel illustrated in Fig. 1, Fig. 3 is a detail showing one of the terminals of the secondary of the transformer, Fig. 4 illustrates the application of the invention to a water heating vessel or boiler, while Fig. 5 illustrates a modification of the connections between the contacts on the vessel and the secondary of the transformer.

Referring to Figs. 1, 2 and 3, $v$ is a cooking vessel provided with knife-contacts $c$ which are adapted to engage with the spring terminals $d$ provided on the secondary circuit $s$ of a static transformer $t$. $m$ is the core of the transformer, and $p$ is one of the primary windings thereof controlled by means of a switch $z$.

The contacts $c$ may be either cast solid with the shell of the vessel $v$, or may be soldered, welded, brazed, bolted or otherwise secured thereto, so as to form a rigid mechanical fixture, and so as to carry the current without overheating. Further, they are secured to the vessel, preferably in such a way as to allow of its standing firmly on its base when not resting on the terminals $d$. With this object in view, the contacts may be placed on the side of the vessel, as shown.

Referring to the modification illustrated in Fig. 4, $b$ is a heating vessel or boiler which is fed with cold water through the pipe $f$, the hot water being discharged through the pipe $e$. The contacts $c$ are secured to the bottom $k$ of the vessel, and their connection with the secondary $s$ of the transformer $t$ is effected by means of bolts passing through the contacts $c$ and flat terminals $d$ provided on the secondary.

Instead of securing the contacts $c$ to the bottom of the vessel $v$, they may be secured to the sides thereof.

In Fig. 5 which illustrates a modification of the contacts, $a$ is the shell of a heating vessel or boiler to which are cast, brazed, soldered, welded, or otherwise attached, a number of contacts $c^1$, $c^2$, $c^3$, $c^4$, the latter having bolted, or otherwise secured to them in a readily detachable way, a corresponding number of laminations $l^1$, $l^2$, $l^3$, $l^4$, which together constitute the laminated secondary coil of the transformer. The latter form of construction of the secondary is designed with the object of avoiding heat being generated in the coil itself by eddy currents.

In the case of a three-phase alternating current supply, the vessels or boilers may be provided with three contacts instead of two, in order to engage with three terminals on the transformer. In this case, the contacts $c$ are preferably symmetrically fixed in order that the resistance of the vessel between any two of the contacts shall be the same.

The vessels are so designed with respect to their shape, thickness, and material, more especially at and in the proximity of the contacts, in such a manner as to insure a higher resistance between the contacts.

The electrical resistance of the shell of the vessel $v$ or $b$ between the contacts is kept high and exceeds .0007 ohms, when the contacts of the vessel engage with the terminals of the secondary in the manner shown in Figs. 1 and 2, and .0001 ohms, when the contacts of the vessel are connected to the terminals of the secondary in the manner shown in Figs. 4 and 5.

I wish it to be understood that the various details for carrying the invention into effect may be modified without in any way departing from the spirit of the invention.

What I claim is:—

1. An electric cooking and heating apparatus for use in a supply circuit of high amperage and low voltage comprising a vessel for receiving the contents to be heated, the shell of the vessel constituting the main resistance of the circuit wherein the heat necessary for heating purposes is developed, projecting contacts rigidly secured to, and in good thermal and electrical contact, with the shell of the vessel and terminals on the supply circuit, the said projecting contacts being capable of engaging in a readily detachable way with the said terminals, as set forth.

2. An electric cooking and heating apparatus for use in a supply circuit of high amperage and low voltage comprising a vessel for receiving the contents to be heated, the shell of the vessel constituting the main resistance of the circuit wherein the heat necessary for heating purposes is developed, projecting contacts rigidly secured to, and in good thermal and electrical contact with, the shell of the vessel and terminals on the supply circuit, the said supply circuit consisting of the secondary coil of a transformer, and the said projecting contacts being capable of engaging in a readily detachable way with the said terminals, as set forth.

3. An electric cooking and heating apparatus for use in a supply circuit of high amperage and low voltage comprising a vessel for receiving the contents to be heated, the shell of the vessel constituting the main resistance of the circuit wherein the heat necessary for heating purposes is developed, projecting contacts rigidly secured to, and in good thermal and electrical contact with, the shell of the vessel and terminals on the supply circuit, the said projecting contacts and terminals being constructed as knife and spring contacts, as set forth.

4. An electric cooking and heating apparatus for use in a supply circuit of high amperage and low voltage comprising a vessel for receiving the contents to be heated, the shell of the vessel constituting the main resistance of the circuit wherein the heat necessary for heating purposes is developed, projecting contacts rigidly secured to, and in good thermal and electrical contact with, the shell of the vessel and terminals on the supply circuit, the said projecting contacts and terminals being constructed as knife and spring contacts, and the resistance of the shell of the vessel between the contacts exceeding .0007 ohms, as set forth.

In testimony whereof I have signed my name to this specification.

CLARENCE HAROLD LAUTH.